United States Patent
Sanka et al.

(10) Patent No.: US 9,504,055 B1
(45) Date of Patent: Nov. 22, 2016

(54) SCHEDULING RECEIVE CHAIN ACTIVITIES ON A MOBILE DEVICE

(71) Applicant: QUALCOMM Incorporated, San Diego, CA (US)

(72) Inventors: Suresh Sanka, Hyderabad (IN); Mukesh Kumar, Hyderabad (IN); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/963,515

(22) Filed: Dec. 9, 2015

(51) Int. Cl.
*H04W 72/12* (2009.01)
*H04W 68/00* (2009.01)
*H04W 74/04* (2009.01)

(52) U.S. Cl.
CPC ....... *H04W 72/1205* (2013.01); *H04W 68/005* (2013.01); *H04W 72/12* (2013.01); *H04W 72/1289* (2013.01); *H04W 74/04* (2013.01)

(58) Field of Classification Search
CPC ........... H04W 72/12; H04W 72/1252; H04W 72/1289; H04W 76/025
See application file for complete search history.

(56) References Cited

U.S. PATENT DOCUMENTS

| | | |
|---|---|---|
| 8,934,460 B1 | 1/2015 | Hu et al. |
| 9,084,287 B2 | 7/2015 | Swaminathan et al. |
| 2007/0097909 A1* | 5/2007 | Khandekar ........... H04W 28/20 370/329 |
| 2011/0051681 A1* | 3/2011 | Ahn ...................... H04L 5/0094 370/330 |
| 2013/0040666 A1 | 2/2013 | Chin et al. |
| 2014/0036710 A1 | 2/2014 | Chin et al. |
| 2014/0119343 A1 | 5/2014 | Chin et al. |

* cited by examiner

*Primary Examiner* — Asghar Bilgrami
(74) *Attorney, Agent, or Firm* — Larry J. Moskowitz

(57) ABSTRACT

Various embodiments include methods for scheduling reception activities on a wireless communication device having a first receive chain and a second receive chain. Various embodiments may include identifying a first reception activity and a second reception activity of a first subscription scheduled on the first receive chain, in which a duration of the second reception activity is longer than a duration of the first reception activity. The wireless communication device may determine whether the first reception activity and the second reception activity can be performed concurrently on the first receive chain, and schedule the second reception activity on the second receive chain in response to determining that the first reception activity and the second reception activity cannot be performed concurrently on the first receive chain.

30 Claims, 7 Drawing Sheets

SCHEDULING RECEIVE CHAIN ACTIVITIES ON A MOBILE DEVICE

BACKGROUND

Some designs of wireless communication devices—such as smart phones, tablet computers, and laptop computers—contain one or more Subscriber Identity Module (SIM) cards that provide users with access to multiple separate mobile telephony networks. Examples of mobile telephony networks include Third Generation (3G), Fourth Generation (4G), Long Term Evolution (LTE), Time Division Multiple Access (TDMA), Frequency Division Multiple Access (FDMA), Code Division Multiple Access (CDMA), Wideband CDMA (WCDMA), Time Division Synchronous CDMA (TD-SCDMA), Global System for Mobile Communications (GSM), and Universal Mobile Telecommunications Systems (UMTS).

A wireless communication device that includes one or more SIMs and connects to two or more separate mobile telephony networks using one or more shared radio frequency (RF) resources/radios may be termed a multi-SIM multi-standby (MSMS) communication device. One example is a dual-SIM dual standby (DSDS) communication device, which includes two SIM cards supporting two subscriptions that are each associated with a separate radio access technology (RAT) sharing on RF resource. In DSDS communication devices, the separate subscriptions share the one RF resource to communicate with two separate mobile telephony networks on behalf of their respective subscriptions.

SUMMARY

Various embodiments include methods implemented on a wireless communication device having a first receive chain and a second receive chain for scheduling reception activities on the wireless communication device. Various embodiments may include identifying a first reception activity and a second reception activity of a first subscription scheduled on the first receive chain, in which a duration of the second reception activity is longer than a duration of the first reception activity, determining whether the first reception activity and the second reception activity can be performed concurrently on the first receive chain, and scheduling the second reception activity on the second receive chain in response to determining that the first reception activity and the second reception activity cannot be performed concurrently on the first receive chain.

In some embodiments, the first reception activity may include paging wakeups. In some embodiments, the second reception activity may include idle mode activities. In some embodiments, the idle mode activities may include at least one of an inter-frequency measurement, an inter-radio access technology (RAT) measurement, a location area update, and a routing area update.

Some embodiments may further include scheduling the second reception activity on the first receive chain in response to determining that the first reception activity and the second reception activity can be performed concurrently on the first receive chain. Some embodiments may further include periodically determining whether there has been a change in either of the first reception activity and the second reception activity, and, in response to determining that there has been a change in either of the first reception activity and the second reception activity, identifying new first and second reception activities of the first subscription and determining whether the new first and second reception activities of the first subscription can be performed concurrently.

Some embodiments may further include identifying a third reception activity and a fourth reception activity of a second subscription scheduled on the second receive chain, in which a duration of the fourth reception activity is longer than a duration of the third reception activity, determining whether the third reception activity and the fourth reception activity can be performed concurrently on the second receive chain, and scheduling the third reception activity on the first receive chain in response to determining that the third reception activity and the fourth reception activity cannot be performed concurrently on the second receive chain. In some embodiments, the third reception activity may include paging wakeups. In some embodiments, the fourth reception activity may include idle mode activities. Some embodiments may further include periodically determining whether there has been a change in either of the third reception activity and the fourth reception activity, and, in response to determining that there has been a change in either of the third reception activity and the fourth subscription activity, identifying third and fourth reception activities of the second subscription and determining whether the third and fourth reception activities of the second subscription can be performed concurrently.

Further embodiments include a wireless communication device including a memory and a processor configured with processor-executable instructions to perform operations of the methods described herein. Further embodiments include a non-transitory processor-readable storage medium having stored thereon processor-executable software instructions configured to cause a processor of a wireless communication device to perform operations of the methods described herein. Further embodiments include a wireless communication device that includes means for performing functions of the operations of the methods described herein.

BRIEF DESCRIPTION OF THE DRAWINGS

The accompanying drawings, which are incorporated herein and constitute part of this specification, illustrate aspects of various embodiments, and together with the general description and the detailed description given herein, serve to explain the features of the embodiments.

DETAILED DESCRIPTION

Figure 1:
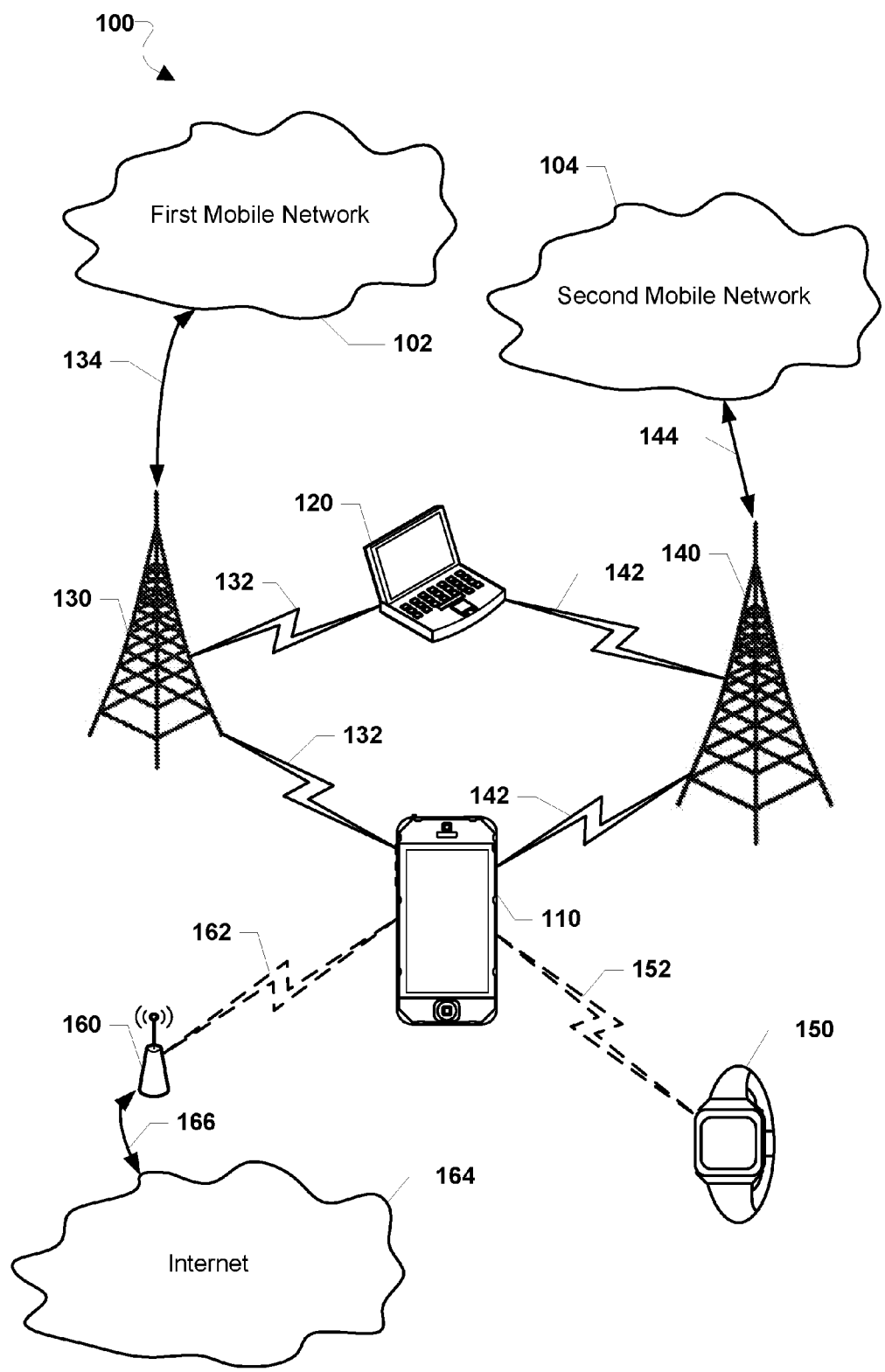
FIG. 1 is a communication system block diagram of a network suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments or the claims.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless communication device on a network and enable a communication service with the network. Because the information stored in a SIM enables the wireless communication device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

As used herein, the terms "mobile communication device," "wireless communication device," "multi-SIM communication device," and "multi-SIM wireless communication device" are used interchangeably to describe a wireless communication device that is configured to receive more than one SIM and support multiple subscriptions associated with the multiple SIMs.

The terms "network," "wireless network," "cellular network," and "cellular wireless communication network" are used interchangeably herein to refer to a portion or all of a wireless network of a carrier associated with a wireless communication device and/or subscription on a wireless communication device.

Modern wireless communication devices (e.g., smartphones) may be configured to accept multiple SIM cards containing SIMs that enable the same wireless communication device to connect to different mobile networks. Each SIM serves to identify and authenticate a subscriber using a particular wireless communication device, and each SIM is typically associated with only one subscription. For example, a SIM may be associated with a subscription to one of LTE, GSM, UTMS, CDMA, TD-SCDMA, or WCDMA.

In the following descriptions of various embodiments, references are made to a first subscription and a second subscription, and a first receive chain and a second receive chain. The references to the first and second subscriptions and first and second receive chains are arbitrary and are used merely for the purposes of describing the embodiments. The device processor may assign any indicator, name or other designation to differentiate the subscriptions and receive chains on the wireless communication device.

An MSMS wireless communication device, for example a DSDS device, may be configured to receive multiple SIMs associated with multiple subscriptions that share an RF resource. The RF resource may support one transmit chain but more than one receive chain. For example, a dual receive device may support two receive chains that may be utilized by one or more subscriptions. In a dual receive DSDS device, a first subscription may utilize a first receive chain while a second subscription may utilize a second receive chain, but only one subscription may utilize the transmit chain to transmit information to its respective network at a time. For example, an active subscription may utilize the transmit chain and a first (or primary) receive chain and the idle subscription(s) may utilize a second (or dual receive) receive chain. Such wireless communication devices may be termed a dual-receive device.

Each subscription may occasionally perform reception activities, whether idle or active (e.g., in a data call). These reception activities may include performing paging wake-ups, and idle mode activities such as inter-frequency measurements, inter-RAT measurements, LAUs, and RAUs. For example, a subscription may periodically receive paging messages from a network through a paging wakeup on a receive chain to check a paging indicator channel (PICH). The subscription may also periodically perform idle mode activities on the same receive chain. Idle mode activities may include inter-frequency measurements, inter-RAT measurements, location area updates (LAU), or routing area updates (RAU). The periodicity of the reception activities may be determined by the subscription's respective network. For example, an idle subscription may periodically wake up to perform idle mode activities or check for paging messages. An active subscription may periodically interrupt a data call to perform idle mode activities or check for paging messages. Each subscription may utilize a separate receive chain to perform its reception activities.

For example, a subscription may attempt a cell reselection by tuning the receive chain from the current cell with frequency $F_1$ to a neighbor cell frequency $F_2$ to receive and decode a system information block (SIB) transmitted by the network on frequency $F_2$. The subscription may also request a LAU or RAU. If the LAU or RAU is rejected or the neighbor cell is otherwise barred and not selectable, the cell reselection fails and the subscription may return to frequency $F_1$ and try to search other neighbor cell frequencies. If the cell reselection is successful, the subscription camps on the network cell with frequency $F_2$. An inter-RAT cell selection may proceed in a similar fashion.

A receive chain may not be able to maintain a data call, receive paging messages, and perform idle mode activities concurrently (i.e., at the same time). Idle mode activities such as inter-frequency measurements have a longer duration than paging wakeup activities. Thus, while a subscription is performing idle mode activities, the subscription may miss one or more paging messages from the network. This means the user may not be notified of an incoming call until the idle mode activities are complete, which may last several seconds. In addition, if the subscription is in an active data call, the call may be interrupted for the duration of the idle mode activities, which reduces the data throughput.

While a subscription is using a receive chain to perform idle mode activities, the receive chain cannot be used to perform paging wakeups. The duration of idle mode activities is usually longer than the duration of paging wakeups (e.g., several second versus several milliseconds). Thus while a subscription is performing idle mode activities it may miss one or more paging messages from the network. This may lead to a delay in notifying a user about an incoming call.

Systems, methods, and devices of various embodiments enable a wireless communication device to schedule reception activities on a wireless communication device to increase data throughput and improve the reception of paging messages. The wireless communication device may have a first receive chain utilized by a first subscription and a second receive chain utilized by a second subscription. A device processor may identify a first reception activity and a second reception activity of the first subscription scheduled on the first receive chain. The duration of the second reception activity may be longer than a duration of the first reception activity. For example, the first reception activity may be a paging wakeup while the second reception activity may involve idle mode activities, such as an inter-frequency measurements, inter-RAT measurements, a LAU, or RAU.

The device processor may determine whether the first reception activity and the second reception activity can be performed concurrently on the first receive chain. If the first reception activity and the second reception activity can be performed concurrently on the first receive chain, the device processor may continue to schedule both activities on the first receive chain. If the first reception activity and the second reception activity cannot be performed concurrently on the first receive chain, the device processor may schedule the second reception activity on the second receive chain. Scheduling the second reception activity on the second receive chain may increase the data throughput of a data call on the first receive chain if the first subscription is active, and may also increase paging message reception rates.

The second subscription may also have reception activities scheduled on the second receive chain, such as paging wakeup or idle mode activities. The device processor may identify a third reception activity and a fourth reception activity of the second subscription scheduled on the second receive chain, in which a duration of the fourth reception activity (e.g., idle mode activities) is longer than a duration of the third reception activity (e.g., paging wakeup). The device processor may determine whether the third reception activity and the fourth reception activity can be performed concurrently on the second receive chain, and schedule the third reception activity on the first receive chain if the third reception activity and the fourth reception activity cannot be performed concurrently on the second receive chain. Thus, longer duration idle mode activities of both subscriptions may be allocated to the second receive chain while shorter duration paging wakeups of both subscriptions may be allocated to the first receive chain. This may lead to an increase in data throughput of a data call on the first receive chain if the first subscription is active, and may also increase paging message reception rates of both subscriptions.

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first wireless communication device 110 may be in communication with the first mobile network 102 through a cellular connection 132 to the first base station 130. The first wireless communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second wireless communication device 120 may similarly communicate with the first mobile network 102 through the cellular connection 132 to the first base station 130. The second wireless communication device 120 may also communicate with the second mobile network 104 through the cellular connection 142 to the second base station 140. The cellular connections 132 and 142 may be made through two-way wireless communication links, such as Third Generation (3G), Fourth Generation (4G), Long Term Evolution (LTE), Time Division Multiple Access (TDMA), Code Division Multiple Access (CDMA), Wideband CDMA (WCDMA), Global System for Mobile Communications (GSM), Universal Mobile Telecommunications Systems (UMTS), and other mobile telephony communication technologies.

While the wireless communication devices 110, 120 are shown connected to the first mobile network 102 and, optionally, to the second mobile network 104, in some embodiments (not shown), the wireless communication devices 110, 120 may include two or more subscriptions to two or more mobile networks and may connect to those subscriptions in a manner similar to those described herein.

In some embodiments, the first wireless communication device 110 may optionally establish a wireless connection 152 with a peripheral device 150 used in connection with the first wireless communication device 110. For example, the first wireless communication device 110 may communicate over a Bluetooth® link with a Bluetooth-enabled personal computing device (e.g., a "smart watch"). In some embodiments, the first wireless communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second wireless communication device 120 may similarly be configured to connect with the peripheral device 150 and/or the wireless access point 160 over wireless links.

Figure 2:
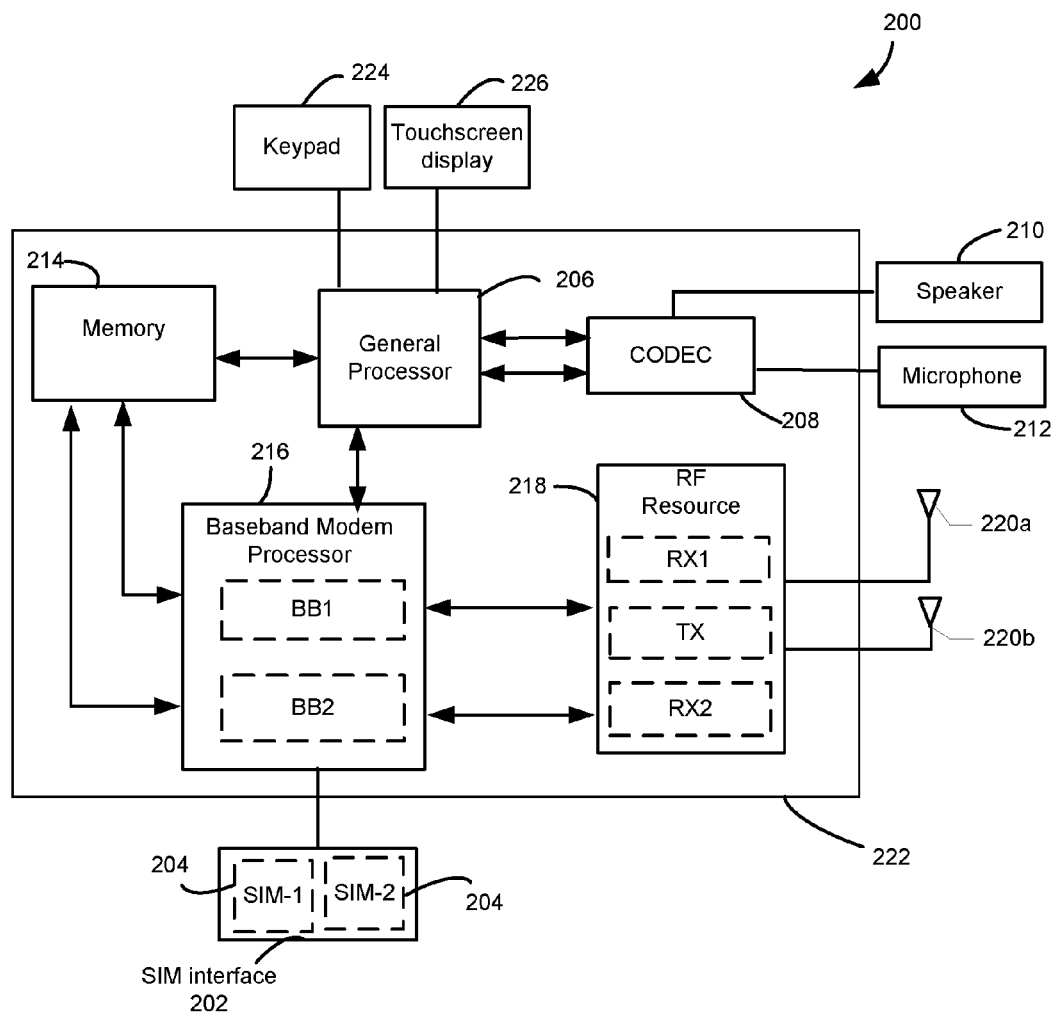
FIG. 2 is a block diagram illustrating a wireless communication device according to various embodiments.

FIG. 2 is a functional block diagram of an example multi-SIM communication device 200 that is suitable for implementing various embodiments. With reference to FIGS. 1-2, the multi-SIM communication device 200 may be similar to one or more of the wireless communication devices 102. The multi-SIM communication device 200 may include a SIM interface 202, which may represent either one or two SIM interfaces. The SIM interface 202 may receive a first identity module SIM 204 that is associated with the first subscription. In some embodiments, the multi-SIM communication device 200 may also include a second SIM interface as part of the SIM interface 202, which may receive a second identity module SIM 204 that is associated with a second subscription.

A SIM in various embodiments may be a Universal Integrated Circuit Card (UICC) that is configured with SIM and/or Universal SIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 204 may have a central processing unit (CPU), read only memory (ROM), random access memory (RAM), electrically erasable programmable read only memory (EEPROM) and input/output (I/O) circuits. A SIM 204 used in various embodiments may contain user account information, an IMSI a set of SIM application toolkit (SAT) commands and storage space for phone book contacts. A SIM 204 may further store home identifiers (e.g., a System Identification Number (SID)/Network Identification Number (NID) pair, a Home Public Land Mobile Number (HPLMN) code, etc.) to indicate the SIM network operator provider. An Integrated Circuit Card Identity (ICCID) SIM serial number may be printed on the SIM card for identification.

The multi-SIM communication device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource. The memory 214 may store operating system (OS), as well as user application software and executable instructions. The memory 214 may also store quality metrics for various channels supported by the SIMs 204 and the RF resource 218.

The general purpose processor 206 and memory 214 may each be coupled to at least one baseband-modem processor 216. Each SIM 204 in the multi-SIM communication device 200 may be associated with a baseband-RF resource that includes a baseband-modem processor 216 and at least one receive block (e.g., RX1, RX2) of an RF resource 218. In various embodiments, baseband-RF resources may include physically or logically separate baseband modem processors (e.g., BB1, BB2).

The RF resource 218 may be coupled to antennas 220a, 220b, and may perform transmit/receive functions for the wireless services associated with each SIM 204 of the multi-SIM communication device 200. In some embodiments, the RF resource 218 may be coupled to wireless antennas 220a, 220b for sending and receiving RF signals for multiple SIMs 204 thereby enabling the multi-SIM communication device 200 to perform simultaneous communications with separate networks and/or service associated with the SIM(s) 204. The RF resource 218 may include separate receive and transmit functionalities, or the RF resource 218 may include a transceiver that combines transmitter and receiver functions. In various embodiments, the transmit functionalities of the RF resource 218 may be implemented by at least one transmit block (TX), which may represent circuitry associated with one or more radio access technologies/SIMs In some embodiments, the general purpose processor 206, memory 214, baseband-modem processor(s) 216, and RF resource 218 may be included in a system-on-chip device 222. The one or more SIM 204 and corresponding interface(s) 202 may be external to the system-on-chip device 222. Further, various input and output devices may be coupled to components of the system-on-chip device 222, such as interfaces or controllers. Example user input components suitable for use in the multi-SIM communication device 200 may include, but are not limited to, a keypad 224 and a touch screen display 226.

In some embodiments, the keypad 224, touch screen display 226, microphone 212, or a combination thereof, may perform the function of receiving the request to initiate an outgoing call. For example, the touch screen display 226 may receive a selection of a contact from a contact list or receive a telephone number. In another example, either or both of the touch screen display 226 and microphone 212 may perform the function of receiving a request to initiate an outgoing call. For example, the touch screen display 226 may receive selection of a contact from a contact list or receive a telephone number. As another example, the request to initiate the outgoing call may be in the form of a voice command received via the microphone 212. Interfaces may be provided between the various software modules and functions in the multi-SIM communication device 200 to enable communication between them, as is known in the art.

Figure 3:
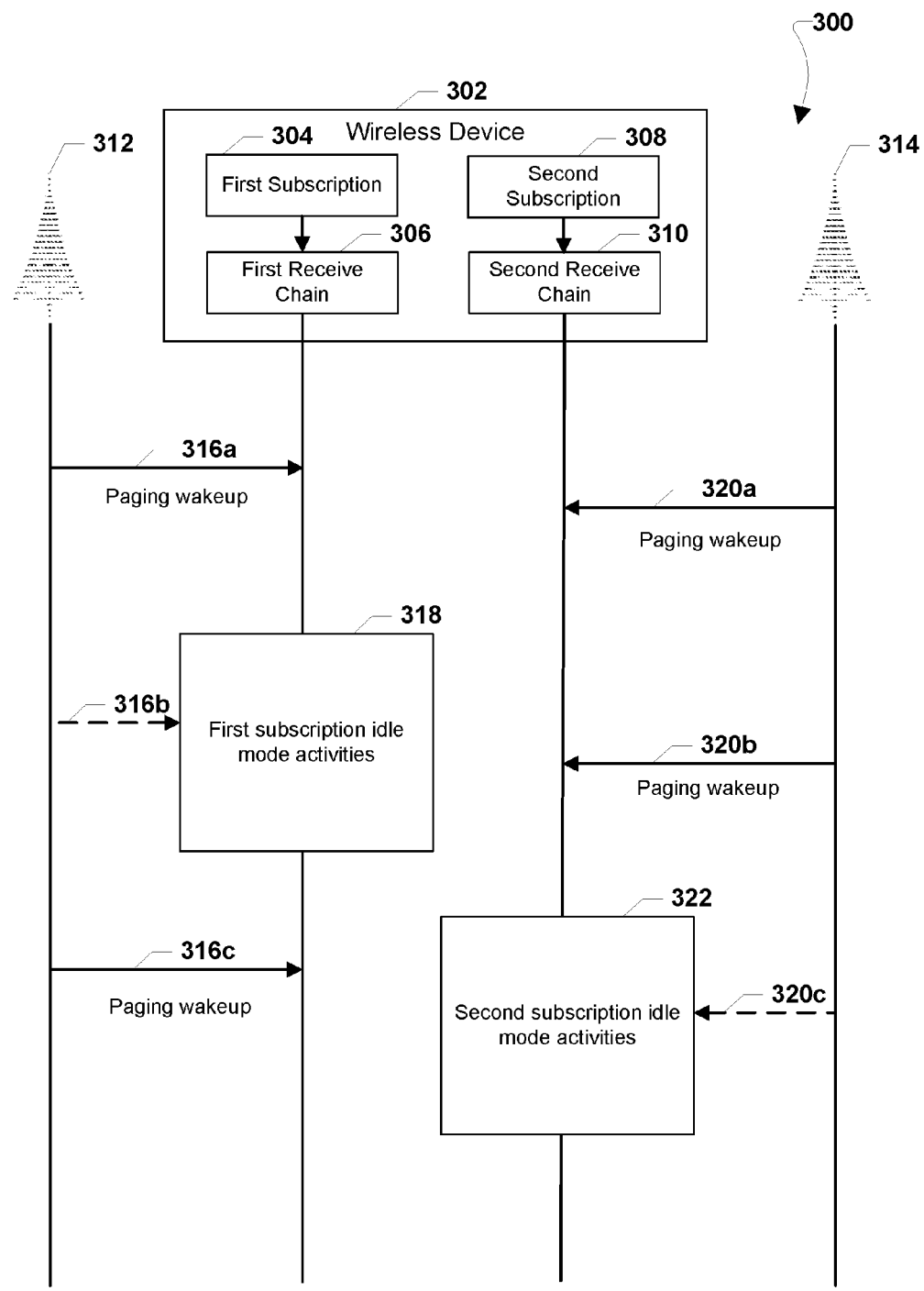
FIG. 3 is a communication flow diagram illustrating conventional scheduling of receive chain activities on a wireless communication device.

FIG. 3 includes a communication flow diagram 300 illustrating conventional scheduling of receive chain activities of a wireless communication device 302. The wireless communication device 302 may be a MSMS device, for example a DSDS device, with a first subscription 304 and a second subscription 308 sharing an RF resource. The RF resource may include a first receive chain 306 and a second receive chain 310. The first subscription 304 may utilize the first receive chain 306 for all reception activities, while the second subscription 308 may utilize the second receive chain 310 for all reception activities. The first subscription 304 may be associated with a first network 312, while the second subscription 308 may be associated with a second network 314.

The first subscription 304 may occasionally perform paging wakeups 316a-316c to check for paging messages from the first network 312 using the first receive chain 306. If the first subscription 304 in engaged in an active data call with the first network 312, the first subscription 304 may suspend the data call on the first receive chain 306 to check the PICH during the paging wakeups 316a-316c.

The first subscription 304 may also occasionally perform idle mode activities 318. The idle mode activities 318 may include, but are not limited to, inter-frequency measurements, inter-RAT measurements, LAUS, and RAUs. If the first subscription 304 in engaged in an active data call with the first network 312, the first subscription 304 may suspend the data call on the first receive chain 306 to perform the idle mode activities 318.

The duration of the idle mode activities 318 is usually longer than the duration of the paging wakeups 316a-316c, and may occasionally overlap. For example, the first network 312 may attempt to send a paging message during the paging wakeup 316b to the first receive chain 306 while the first receive chain 306 is performing the idle mode activities 318. Thus the first subscription 304 does not perform the paging wakeup 316b and misses (i.e., does not receive) any paging messages sent during the paging wakeup 316b. While FIG. 3 illustrates an example of one missed paging message, in general the first subscription 304 may miss multiple paging messages while performing the idle mode activities 318.

In a similar fashion, the second subscription 308 may occasionally perform paging wakeups 320a-320c from the second network 314 using the second receive chain 310. If the second subscription 308 in engaged in an active data call with the second network 314, the second subscription 308 may suspend the data call on the second receive chain 310 to check the PICH during the paging wakeups 320a-320c.

The second subscription 308 may also occasionally perform idle mode activities 322. The idle mode activities 322 may include, but are not limited to, inter-frequency measurements, inter-RAT measurements, LAUS, and RAUs. If the second subscription 308 in engaged in an active data call with the second network 314, the second subscription 308 may suspend the data call on the second receive chain 310 to perform the idle mode activities 322.

As described, the duration of the idle mode activities 322 is usually longer than the duration of the paging wakeups 320a-320c, and may occasionally overlap. For example, the second network 314 may attempt to send a paging message during the paging wakeup 320c through the second receive chain 310 while the second receive chain 310 is performing the idle mode activities 322. Thus the second subscription 308 misses (i.e., does not receive) the paging message.

Because all reception activities of the first subscription 304 are scheduled on the first receive chain 306 and all reception activities of the second subscription 308 are scheduled on the second receive chain 310, each subscription may miss one or more paging messages while performing idle mode activities. Further, the idle mode activities 318, 322 may disrupt an active data call on either the first subscription 304 or the second subscription 308 for a longer duration than the paging wakeups 316a-316c, 320a-320c, leading to reduced data throughput.

Various embodiments include systems and methods that may dynamically schedule reception activities of multiple subscriptions in a dual-receive wireless communication device between the multiple receive chains to reduce the rate of missed paging messages and/or increase the data throughput of a data call. For example, one receive chain may be dedicated to performing longer duration idle mode activities of multiple subscriptions while another receive chain may be dedicated to performing shorter duration paging wakeups of multiple subscriptions. This prevents the idle mode activities from colliding with paging wakeups. An active data call may be scheduled on the receive chain performing the paging wakeups because there is less interruption than with idle mode activities. Additionally, cell reselection following the idle mode activities may be completed faster.

Figure 4:
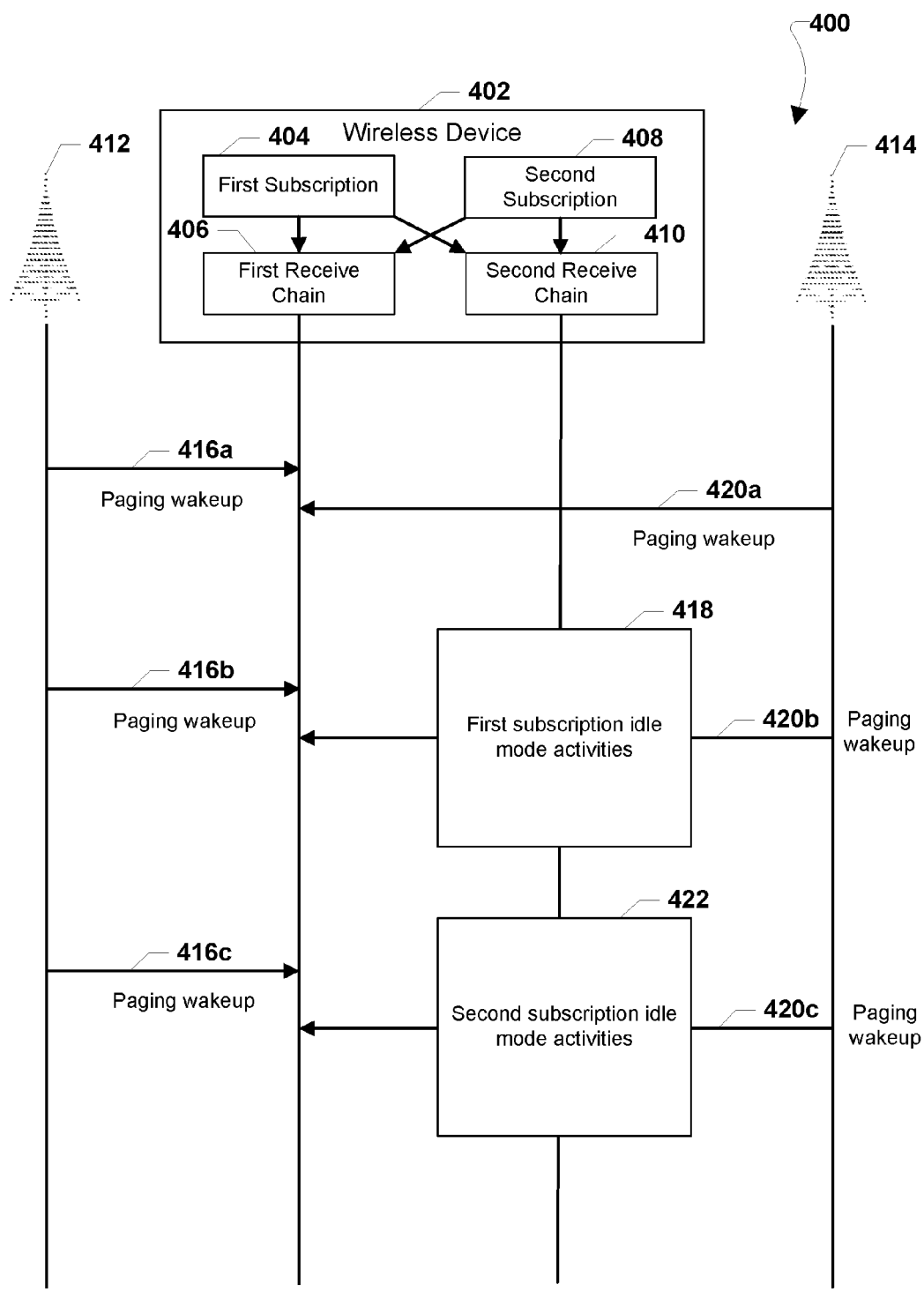
FIG. 4 is a communication flow diagram illustrating dynamic scheduling of receive chain activities on a wireless communication device according to various embodiments.

FIG. 4 is a communication flow diagram 400 illustrating scheduling of receive chain activities of a wireless communication device 402 according to various embodiments. With reference to FIGS. 1-2 and 4, the wireless communication device 402 may be a MSMS device (e.g., 110, 200), for example a DSDS device, with a first subscription 404 and a second subscription 408 sharing an RF resource (e.g., 218). The RF resource may include a first receive chain 406 and a second receive chain 410. The first subscription 404 may be associated with a first network 412, while the second subscription 408 may be associated with a second network 414.

The first subscription 404 may occasionally perform paging wakeups 416a-416c to check for paging messages from the first network 412, and the second subscription 408 may occasionally perform paging wakeups 420a-420c to check for paging messages from the second network 414. In addition, the first subscription 404 may occasionally perform idle mode activities 418, and the second subscription 408 may occasionally perform idle mode activities 422. The paging wakeups 416a-416c, 420a-420c and the idle mode activities 418, 422 may be termed reception activities.

The reception activities of the first subscription 404 and the second subscription 408 may be dynamically allocated between the first receive chain 406 and the second receive chain 410. This differs from the communication flows illustrated in the diagram 300 (FIG. 3) in which the first subscription 304 only uses the first receive chain 306 and the second subscription 308 only uses the second receive chain 310.

A processor on the wireless communication device 302, for example the general purpose processor 202 and/or the baseband modem processor 216, may identify the scheduled reception activities of the first subscription 404 and the second subscription 408. For example, the processor may determine that the first subscription 404 is scheduled to perform paging wakeups 416a-416c and the idle mode activities 418 on the first receive chain 406. Likewise, the processor may determine that the second subscription 408 is scheduled to perform paging wakeups 420a-420c and the idle mode activities 422 on the second receive chain 410.

The processor may determine whether the reception activities can be performed concurrently as originally scheduled (i.e., whether there will be collisions between the reception activities). The processor may determine that the paging wakeup 416b and the idle mode activities 418 will collide if performed on the same receive chain, and the processor may also determine that the paging wakeup 420c and the idle mode activities 422 will collide if performed on the same receive chain.

The processor may then allocate or reschedule the reception activities to reduce the rate of paging message misses and/or increase the data throughput of an active data call on a receive chain. For example, the processor may schedule the paging wakeups 416a-416c, 420a-420c for both the first subscription 404 and the second subscription 408 on the first receive chain 406. Likewise, the processor may schedule the idle mode activities 418, 422 for both the first subscription 404 and the second subscription 408 on the second receive chain 410. With this scheduling, the paging wakeup 416b will no longer collide with the idle mode activities 418 as the two receive activities are performed on different receive chains. Similarly, the paging wakeup 420c will no longer collide with the idle mode activities 422 as the two receive activities are also performed on difference receive chains.

The processor may schedule the longer duration idle mode activities 418, 422 on one receive chain (e.g., the second receive chain 410) while scheduling the shorter duration paging wakeups 416a-416c, 420a-420c on the other receive chain (e.g., the first receive chain 406). This may be advantageous when one of the subscriptions (e.g., the first subscription 404) is on an active data call. Interrupting the data call to perform the idle mode activities 418 results in a longer disruption to the data call than performing the paging wakeups 416a-416c. So by scheduling the reception activities with longer duration on the receive chain that is not supporting the active data call (e.g., the second receive chain 410), the data throughput of the data call on the receive chain that is not supporting the active data call (e.g., the first receive chain 406) may be increased.

In addition, scheduling idle mode activities, such as inter-frequency measurements, LAUs, and RAUs, on one receive chain may also improve the cell reselection process. For example, the first subscription 404 may be camped on a base station of the network 412 with frequency $F_1$ using the first receive chain 406. To perform cell reselection using the first receive chain 406, the first subscription 404 may first tune the first receive chain 406 to a neighbor cell frequency $F_2$ and decode the SIBs on that frequency and request a LAU or RAU. If the LAU or RAU is rejected or the cell is barred and not selectable, the cell reselection fails and the first receive chain 406 returns to frequency $F_1$. The first subscription 404 then tunes the first receive chain 406 to another neighbor cell frequency $F_3$ and determines whether the cell can be selected.

However, if the second receive chain 410 is assigned to perform the idle mode activities of the first subscription 404, the second receive chain 410 may be used to tune to frequencies $F_2$ and $F_3$ consecutively, decode the SIBs on both frequencies, and request LAUs or RAUs to determine the neighbor cell that is better for cell reselection. In this way, the first subscription 404 may avoid the failed attempt to camp on neighbor frequency $F_2$ before attempting to camp on neighbor frequency $F_3$.

Figure 5:
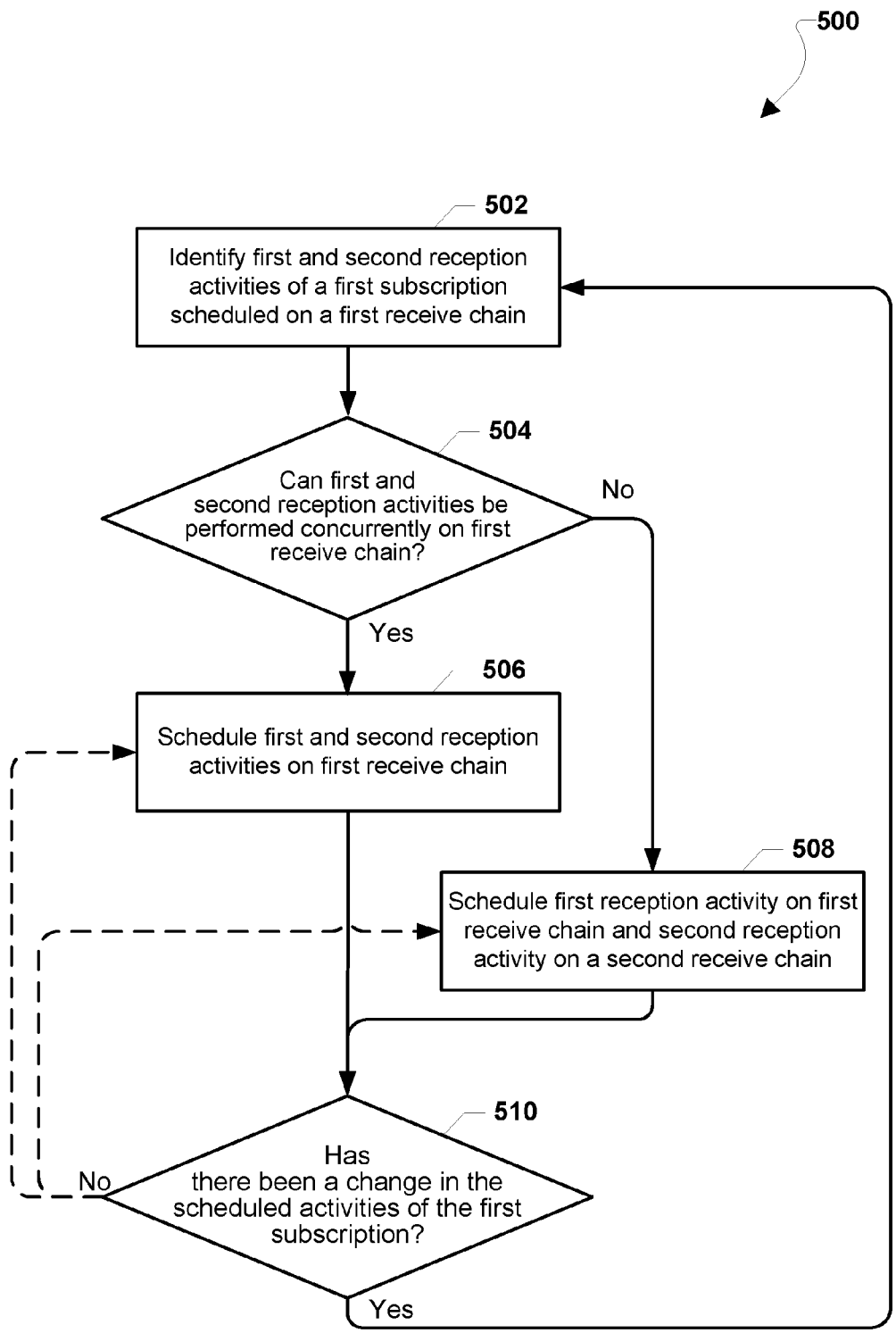
FIG. 5 is a process flow diagram illustrating a method of scheduling reception activities on a wireless communication device according to various embodiments.

FIG. 5 illustrates a method 500 for scheduling reception activities on a wireless communication device according to various embodiments. With reference to FIGS. 1-2 and 4-5, the operations of the method 500 may be implemented by one or more processors of the multi-SIM communication device 110, 200, such as a general purpose processor 206, a baseband modem processor(s) 216, or a separate controller (not shown) that may be coupled to the memory 214 and to the baseband modem processor(s) 216. The wireless communication device may be a MSMS device, for example a DSDS device with a first subscription and a second subscription sharing an RF resource. The RF resource may include a first receive chain utilized by the first subscription and a second receive chain utilized by the second subscription.

In block 502, the processor may identify a first reception activity and a second reception activity of the first subscription scheduled on the first receive chain of the wireless communication device. The time duration of the first reception activity may be less than the time duration of the second reception activity. For example, the first reception activity may be paging wakeups and the second reception may be idle mode activities including at least one of an inter-frequency measurement, an inter-RAT measurement, a LAU, and a RAU. The first subscription may also be currently performing other activities as well, such as engaging in a data call with its respective network. The second subscription may also have scheduled reception activities on the second receive chain, such as paging wakeups and idle mode activities.

In determination block 504, the processor may determine whether the first reception activity and the second reception activity of the first subscription can be performed concurrently on the first receive chain. For example, the processor may determine whether the first reception activity of the first subscription collides (i.e., overlaps in time) with the second reception activity of the same subscription. In such cases the first receive chain may not be able to perform both reception activities of the first subscription concurrently.

In response to determining that the first reception activity and the second reception activity can be performed concurrently on the first receive chain (i.e., determination block 504="Yes"), the processor may continue scheduling the first reception activity and the second reception activity of the first subscription on the first receive chain in block 506.

In response to determining that the first reception activity and the second reception activity of the first subscription cannot be performed concurrently on the first receive chain (i.e., determination block 504="No"), the processor may continue scheduling the first reception activity of the first subscription on the first receive chain, but schedule the second reception activity of the first subscription on the second receive chain in block 508. Scheduling the reception activities in this manner allows the first reception activity and the second reception activity of the first subscription to be performed concurrently.

While scheduling and performing the first and second reception activities of the first subscription on the appropriate receive chains in block 506 or block 508, the processor may periodically determine whether there has been a change in the scheduled activities of the first subscription in determination block 510. For example, the processor may periodically determine whether the first subscription initiated or ceased a data call, or has camped on another cell. Camping on another cell may change the periodicity, duration and/or relative timing of paging wakeups, idle mode activities, and other reception activities.

In response to determining that there has not been a change in the scheduled activities of the first subscription (i.e., determination block 510="No"), the processor may continue to schedule the first and second reception activities of the first subscription as scheduled on the appropriate receive chains in either of block 506 or block 508 as previously determined in determination block 504.

In response to determining that there has been a change in the scheduled activities of the first subscription (i.e., determination block 510="Yes"), the processor may identify new first and second reception activities of the first subscription in block 502 and determine whether the new first and second reception activities can be performed concurrently in determination block 504. In this manner, the method 500 provides a way to efficiently schedule reception activities among receive chains in a wireless communication device.

Although the method 500 is described with respect to the first subscription, the references to "first" and "second" are arbitrary and the method 500 may be performed for either subscription reception activities and may be applied to the second subscription (and additional subscriptions active on the wireless communication device) simultaneously. In other words, the processor may simultaneously or sequentially perform the method 500 for the second subscription, evaluating and scheduling first and second activities of the second subscription in the same or similar manner as for the first subscription. For example, the processor may schedule certain reception activities of all subscriptions on a first receive chain and schedule other reception activities of all subscriptions on a second receive chain. Scheduling reception activities of multiple subscriptions is described in more detail with reference to FIG. 6.

Figure 6:
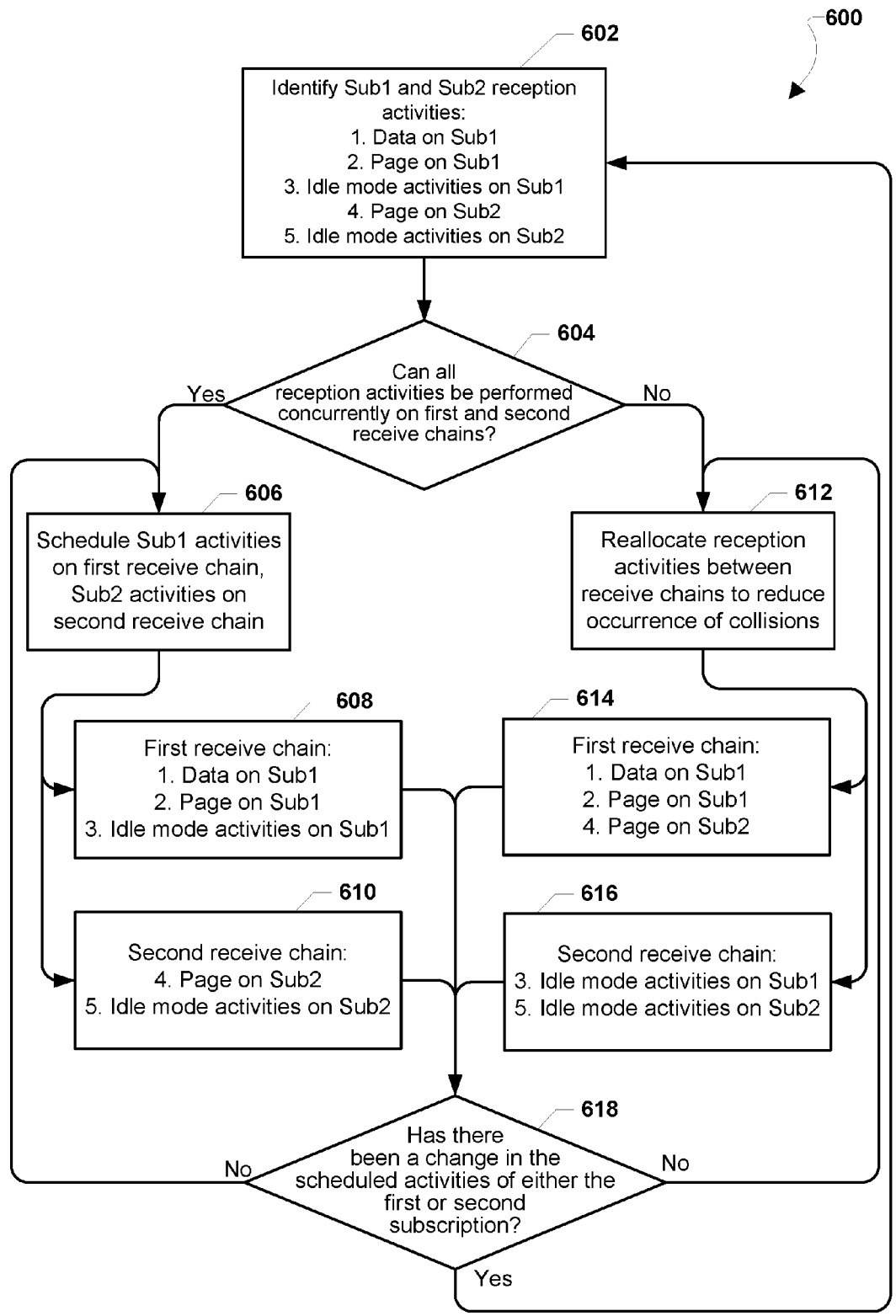
FIG. 6 is a process flow diagram illustrating another method of scheduling reception activities on a wireless communication device according to various embodiments.

FIG. 6 illustrates a method 600 for scheduling reception activities on a wireless communication device according to various embodiments. With reference to FIGS. 1-2 and 4-6, the operations of the method 600 may be implemented by one or more processors of the multi-SIM communication device 110, 200, such as a general purpose processor 206, a baseband modem processor(s) 216, or a separate controller (not shown) that may be coupled to the memory 214 and to the baseband modem processor(s) 216. The wireless communication device may be a MSMS device, for example a DSDS device with a first subscription and a second subscription sharing an RF resource. The RF resource may include a first receive chain utilized by the first subscription and a second receive chain utilized by the second subscription.

In block 602, the processor may identify the reception activities of the first and second subscriptions. For example, the first subscription may be engaged in a data call, as well as scheduled paging wakeups and idle mode activities. All of the reception activities of the first subscription may be scheduled on the first receive chain. The second subscription may be scheduled to perform paging wakeups and idle mode activities, all scheduled on the second receive chain.

In determination block 604, the processor may determine whether all of the identified reception activities of both subscriptions can be performed concurrently on the first and second receive chains. For example, the processor may determine whether the data call, paging wakeups, and idle mode activities scheduled on the first receive chain will collide. Likewise, the processor may determine whether the paging wakeups and idle mode activities scheduled on the second receive chain will collide.

In response to determining that all reception activities can be performed concurrently on the first and second receive chains (i.e., determination block 604="Yes"), the processor may schedule all the reception activities of the first subscription on the first receive chain and schedule all the reception activities of the second subscription on the second receive chain in block 606. For example, the first receive chain may be assigned to maintain the data call for the first subscription, as well as the paging wakeups and idle mode activities of the first subscription in block 608. Likewise, the second receive chain may be assigned to perform the paging wakeups and idle mode activities of the second subscription in block 610.

In response to determining that all of reception activities cannot be performed concurrently on the first and second receive chains (i.e., determination block 604="No"), the processor may reallocate the reception activities between the first and second receive chains to reduce the occurrence of collisions between the reception activities in block 612. For example, the first receive chain may be assigned to maintain the data call for the first subscription, as well as the paging wakeups of the first and second subscriptions in block 614. The second receive chain may be assigned to perform the idle mode activities of the first and second subscriptions in block 616. Scheduling the longer duration idle mode activities to the second receive chain may increase the data throughput of the data call on the first receive chain. Also, scheduling the paging wakeups of both subscriptions on the first receive chain may avoid collisions with the idle mode activities being performed on the second receive chain. This may increase the page message reception rate of both subscriptions. In this manner, the method 600 provides a way to schedule reception activities of multiple subscriptions to increase data throughput and/or page message reception rates.

While scheduling and performing the first and second reception activities of the first subscription on the appropriate receive chains in block 606 or block 612, the processor may periodically determine whether there has been a change in the scheduled activities of either of the first and second subscriptions in determination block 618. For example, the processor may periodically determine whether either of the first and second subscriptions initiated or ceased a data call, or has camped on another cell.

In response to determining that there has not been a change in the scheduled activities of the first and second subscriptions (i.e., determination block 618="No"), the processor may continue to schedule the first and second reception activities of the first subscription as scheduled on the appropriate receive chains in either of block 606 (including blocks 608 and 610) or block 612 (including blocks 614 and 616) as previously determined in determination block 604.

In response to determining that there has been a change in the scheduled activities of the first subscription (i.e., determination block 618="Yes"), the processor may identify new reception activities of the first and second subscriptions in block 602 and determine whether all reception activities can be performed concurrently in determination block 604.

Figure 7:
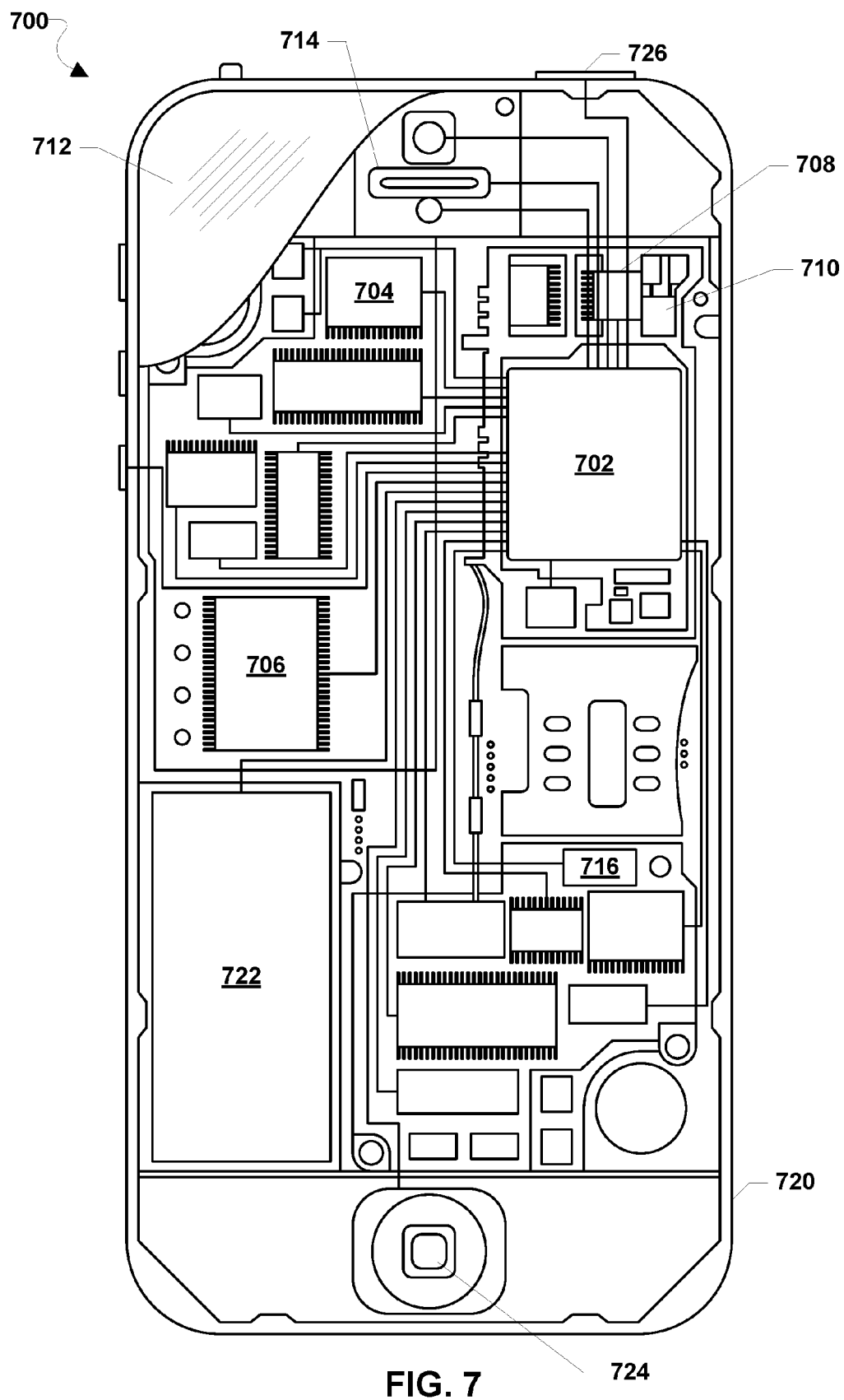
FIG. 7 is a component diagram of an example wireless communication device suitable for use with various embodiments.

Various embodiments may be implemented in any of a variety of wireless communication devices, an example of which (e.g., wireless communication device 700) is illustrated in FIG. 7. According to various embodiments, the wireless communication device 700 may be similar to the wireless communication devices 110, 120 as described with reference to FIG. 1, as well as the wireless communication device 200 and 402 as described with reference to FIGS. 2 and 4. As such, the wireless communication device 700 may implement the methods 500 and 600 in FIGS. 5 and 6.

With reference to FIGS. 1-2 and 4-7, the wireless communication device 700 may include a processor 702 coupled to a touchscreen controller 704 and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the wireless communication device 700 need not have touch screen capability.

The wireless communication device 700 may have one or more cellular network transceivers 708 coupled to the processor 702 and to one or more antennas 710 and configured for sending and receiving cellular communications. The one or more transceivers 708 and the one or more antennas 710 may be used with the herein-mentioned circuitry to implement methods according to various embodiments. The wireless communication device 700 may include one or more SIM cards 716 coupled to the one or more transceivers 708 and/or the processor 702 and may be configured as described herein.

The wireless communication device 700 may also include speakers 714 for providing audio outputs. The wireless communication device 700 may also include a housing 720, constructed of a plastic, metal, or a combination of materials, for containing all or some of the components discussed herein. The wireless communication device 700 may include a power source 722 coupled to the processor 702, such as a disposable or rechargeable battery. The rechargeable battery may also be coupled to the peripheral device connection port to receive a charging current from a source external to the wireless communication device 700. The wireless communication device 700 may also include a physical button 724 for receiving user inputs. The wireless communication device 700 may also include a power button 726 for turning the wireless communication device 700 on and off.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, compact disc read only memory (CD-ROM) or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc in which disks usually reproduce data magnetically, while discs reproduce data optically with lasers. Combinations of the storage media are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of scheduling reception activities on a wireless communication device having a first receive chain and a second receive chain, comprising:
   identifying a first reception activity and a second reception activity of a first subscription scheduled on the first receive chain, wherein a duration of the second reception activity is longer than a duration of the first reception activity;
   determining whether the first reception activity and the second reception activity can be performed concurrently on the first receive chain; and
   scheduling the second reception activity on the second receive chain in response to determining that the first reception activity and the second reception activity cannot be performed concurrently on the first receive chain.

2. The method of claim 1, wherein the first reception activity comprises paging wakeups.

3. The method of claim 1, wherein the second reception activity comprises idle mode activities.

4. The method of claim 3, wherein the idle mode activities includes at least one of an inter-frequency measurement, an inter-radio access technology (RAT) measurement, a location area update, and a routing area update.

5. The method of claim 1, further comprising scheduling the second reception activity on the first receive chain in response to determining that the first reception activity and the second reception activity can be performed concurrently on the first receive chain.

6. The method of claim 1, further comprising:
   periodically determining whether there has been a change in either of the first reception activity and the second reception activity; and
   identifying new first and second reception activities of the first subscription and determining whether the new first and second reception activities of the first subscription can be performed concurrently in response to determining that there has been a change in either of the first reception activity and the second reception activity.

7. The method of claim 1, further comprising:
   identifying a third reception activity and a fourth reception activity of a second subscription scheduled on the second receive chain, wherein a duration of the fourth reception activity is longer than a duration of the third reception activity;
   determining whether the third reception activity and the fourth reception activity can be performed concurrently on the second receive chain; and
   scheduling the third reception activity on the first receive chain in response to determining that the third reception activity and the fourth reception activity cannot be performed concurrently on the second receive chain.

8. The method of claim 7, wherein the third reception activity comprises paging wakeups.

9. The method of claim 7, wherein the fourth reception activity comprises idle mode activities.

10. The method of claim 7, further comprising:
    periodically determining whether there has been a change in either of the third reception activity and the fourth reception activity; and
    identifying new third and fourth reception activities of the second subscription and determining whether the new third and fourth reception activities of the second subscription can be performed concurrently in response to determining that there has been a change in either of the third reception activity and the fourth reception activity.

11. A wireless communication device, comprising:
a radio frequency (RF) resource; and
a processor coupled to the RF resource, configured to connect to a first subscriber identity module (SIM) associated with a first subscription capable of utilizing a first receive chain and a second receive chain, and configured with processor-executable instructions to:
identify a first reception activity and a second reception activity of the first subscription scheduled on the first receive chain, wherein a duration of the second reception activity is longer than a duration of the first reception activity;
determine whether the first reception activity and the second reception activity can be performed concurrently on the first receive chain; and
scheduling the second reception activity on the second receive chain in response to determining that the first reception activity and the second reception activity cannot be performed concurrently on the first receive chain.

12. The wireless communication device of claim 11, wherein the first reception activity comprises paging wake-ups.

13. The wireless communication device of claim 11, wherein the second reception activity comprises idle mode activities.

14. The wireless communication device of claim 13, wherein the idle mode activities includes at least one of an inter-frequency measurement, an inter-radio access technology (RAT) measurement, a location area update, and a routing area update.

15. The wireless communication device of claim 11, wherein the processor is further configured with processor-executable instructions to schedule the second reception activity on the first receive chain in response to determining that the first reception activity and the second reception activity can be performed concurrently on the first receive chain.

16. The wireless communication device of claim 11, wherein the processor is further configured with processor-executable instructions to:
periodically determine whether there has been a change in either of the first reception activity and the second reception activity; and
identify new first and second reception activities of the first subscription and determine whether the new first and second reception activities of the first subscription can be performed concurrently in response to determining that there has been a change in either of the first reception activity and the second reception activity.

17. The wireless communication device of claim 11, wherein the processor is further configured with processor-executable instructions to:
identify a third reception activity and a fourth reception activity of a second subscription scheduled on the second receive chain, wherein a duration of the fourth reception activity is longer than a duration of the third reception activity;
determine whether the third reception activity and the fourth reception activity can be performed concurrently on the second receive chain; and
schedule the third reception activity on the first receive chain in response to determining that the third reception activity and the fourth reception activity cannot be performed concurrently on the second receive chain.

18. The wireless communication device of claim 17, wherein the third reception activity comprises paging wake-ups.

19. The wireless communication device of claim 17, wherein the fourth reception activity comprises idle mode activities.

20. The wireless communication device of claim 17, wherein the processor is further configured with processor-executable instructions to:
periodically determine whether there has been a change in either of the third reception activity and the fourth reception activity; and
identify new third and fourth reception activities of the second subscription and determine whether the new third and fourth reception activities of the second subscription can be performed concurrently in response to determining that there has been a change in either of the third reception activity and the fourth reception activity.

21. A non-transitory computer readable storage medium having stored thereon processor-executable software instructions configured to cause a processor of a wireless communication device to perform operations comprising:
identifying a first reception activity and a second reception activity of a first subscription scheduled on a first receive chain, wherein a duration of the second reception activity is longer than a duration of the first reception activity;
determining whether the first reception activity and the second reception activity can be performed concurrently on the first receive chain; and
scheduling the second reception activity on a second receive chain in response to determining that the first reception activity and the second reception activity cannot be performed concurrently on the first receive chain.

22. The non-transitory computer readable storage medium of claim 21, wherein the first reception activity comprises paging wakeups.

23. The non-transitory computer readable storage medium of claim 21, wherein the second reception activity comprises idle mode activities.

24. The non-transitory computer readable storage medium of claim 23, wherein the idle mode activities includes at least one of an inter-frequency measurement, an inter-radio access technology (RAT) measurement, a location area update, and a routing area update.

25. The non-transitory computer readable storage medium of claim 21, wherein the stored processor-executable software instructions are configured to cause the processor to perform operations further comprising:
scheduling the second reception activity on the first receive chain in response to determining that the first reception activity and the second reception activity can be performed concurrently on the first receive chain.

26. The non-transitory computer readable storage medium of claim 21, wherein the stored processor-executable software instructions are configured to cause the processor to perform operations further comprising:
periodically determining whether there has been a change in either of the first reception activity and the second reception activity; and
identifying new first and second reception activities of the first subscription and determining whether the new first and second reception activities of the first subscription can be performed concurrently in response to determining that there has been a change in either of the first reception activity and the second reception activity.

27. The non-transitory computer readable storage medium of claim 21, wherein the stored processor-executable software instructions are configured to cause the processor to perform operations further comprising:
- identifying a third reception activity and a fourth reception activity of a second subscription scheduled on the second receive chain, wherein a duration of the fourth reception activity is longer than a duration of the third reception activity;
- determining whether the third reception activity and the fourth reception activity can be performed concurrently on the second receive chain; and
- scheduling the third reception activity on the first receive chain in response to determining that the third reception activity and the fourth reception activity cannot be performed concurrently on the second receive chain.

28. The non-transitory computer readable storage medium of claim 27, wherein the third reception activity comprises paging wakeups.

29. The non-transitory computer readable storage medium of claim 27, wherein the fourth reception activity comprises idle mode activities.

30. A wireless communication device, comprising:
- means for identifying a first reception activity and a second reception activity of a first subscription scheduled on a first receive chain, wherein a duration of the second reception activity is longer than a duration of the first reception activity;
- means for determining whether the first reception activity and the second reception activity can be performed concurrently on the first receive chain; and
- means for scheduling the second reception activity on a second receive chain in response to determining that the first reception activity and the second reception activity cannot be performed concurrently on the first receive chain.

* * * * *